US012809507B2

United States Patent

(12) United States Patent
Yu et al.

(10) Patent No.: US 12,809,507 B2
(45) Date of Patent: Nov. 24, 2026

(54) EFFECT PROCESSING METHOD AND APPARATUS, ELECTRONIC DEVICE AND STORAGE MEDIUM

(71) Applicants: Beijing Zitiao Network Technology Co., Ltd., Beijing (CN); Lemon Inc., Grand Cayman (KY)

(72) Inventors: Lijuan Yu, Beijing (CN); Kewei Chen, Beijing (CN); Kexin Lin, Los Angeles, CA (US); Qingyu Chen, Los Angeles, CA (US); Haishan Liu, Beijing (CN); Shengru Wang, Beijing (CN)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 175 days.

(21) Appl. No.: 18/679,217

(22) Filed: May 30, 2024

(65) Prior Publication Data

US 2024/0402894 A1 Dec. 5, 2024

(30) Foreign Application Priority Data

May 31, 2023 (CN) ........................ 202310639491.3

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC ............ G06F 3/04817; G06F 3/04845; G06F 3/0482; H04L 51/04; H04L 12/1813; H04N 21/4788; A63F 13/87; G06T 11/60
See application file for complete search history.

(56) References Cited

U.S. PATENT DOCUMENTS

2006/0001758 A1* 1/2006 Nam ....................... G06T 11/60 348/333.12
2022/0377257 A1* 11/2022 Wilson ..................... G06N 3/09
(Continued)

FOREIGN PATENT DOCUMENTS

CN 113938618 A 1/2022
CN 114428573 A 5/2022
(Continued)

OTHER PUBLICATIONS

China Patent Application No. 202310639491.3; Office Action; dated Jun. 30, 2026; 9 pages.

*Primary Examiner* — Rinna Yi
(74) *Attorney, Agent, or Firm* — BakerHostetler

(57) ABSTRACT

An effect processing method and apparatus, an electronic device, and a storage medium. The processing method includes: displaying an effect processing page, the effect processing page displaying an image to be processed; in response to an addition trigger operation for an effect processing identifier in the effect processing page, determining an effect processing tool corresponding to the effect processing identifier, and determining an effect processing mode corresponding to the effect processing tool; and, in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

20 Claims, 7 Drawing Sheets

(56) References Cited

U.S. PATENT DOCUMENTS

| | | | | |
|---|---|---|---|---|
| 2022/0392130 | A1* | 12/2022 | Sun | H04N 23/80 |
| 2025/0029299 | A1* | 1/2025 | Lv | G06T 11/60 |

FOREIGN PATENT DOCUMENTS

| | | | |
|---|---|---|---|
| CN | 115379136 | A | 11/2022 |
| CN | 116170627 | A | 5/2023 |

* cited by examiner

EFFECT PROCESSING METHOD AND APPARATUS, ELECTRONIC DEVICE AND STORAGE MEDIUM

CROSS-REFERENCE TO RELATED APPLICATION(S)

The present application claims priority of the Chinese Patent Applications No. 202310639491.3 filed on May 31, 2023, the content of which is incorporated as a part of the present application.

TECHNICAL FIELD

Embodiments of the present disclosure relate to the technical field of human-computer interaction, in particular to an effect processing method and apparatus, an electronic device and a storage medium.

BACKGROUND

In scenarios involving image processing or video production, the application of effect processing tools is highly favored by users. Once effect processing tools are created, they can be applied to images or videos to achieve the corresponding effects.

In the related art, during effect processing, typically after triggering any effect processing tool, effect images or videos obtained after processing with the triggered effect processing tool can be displayed. However, users have very limited access to relevant information about the effect processing tools and cannot further interact with them, leading to a rather limited interaction mode for the effect processing tools. Moreover, the display effects of effect images or videos are relatively fixed, impacting the user experience with the effect processing tools.

SUMMARY

The present disclosure provides an effect processing method, apparatus, electronic device and storage medium, so as to realize the flexible application of effects processing tools.

According a first aspect, embodiments of the present disclosure provides an effect processing method, including:

displaying an effect processing page, the effect processing page displaying an image to be processed;

in response to an addition trigger operation for an effect processing identifier in the effect processing page, determining an effect processing tool corresponding to the effect processing identifier, and determining an effect processing mode corresponding to the effect processing tool; and in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

According to a second aspect, embodiments of the present disclosure provides an effect processing apparatus, the apparatus includes:

an effect processing page display module configured to display an effect processing page, the effect processing page displaying an image to be processed;

an effect processing identifier trigger module configured to, in response to an addition trigger operation for an effect processing identifier in the effect processing page, determine an effect processing tool corresponding to the effect processing identifier, and determine an effect processing mode corresponding to the effect processing tool; and an effect image display module configured to, in response to a plurality of effect processing modes existing, generate an effect processing item corresponding to each of the plurality of effect processing modes, display the effect processing item in the effect processing page, and display an effect image obtained by applying effect processing items to the image to be processed.

According to a third aspect, the embodiments of the present disclosure provide an electronic device, the electronic device includes:

one or more processors; and a memory configured to store one or more programs, wherein the one or more programs, when executed by the one or more processors, cause the one or more processors to implement any one of the abovementioned effect processing methods.

According to a fourth aspect, embodiments of the present disclosure further provides a storage medium containing computer-executable instructions, wherein the computer-executable instructions, when executed by a computer processor, perform any one of the abovementioned effect processing methods.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the original and elements are not necessarily drawn to scale.

DETAILED DESCRIPTION

Figure 1:
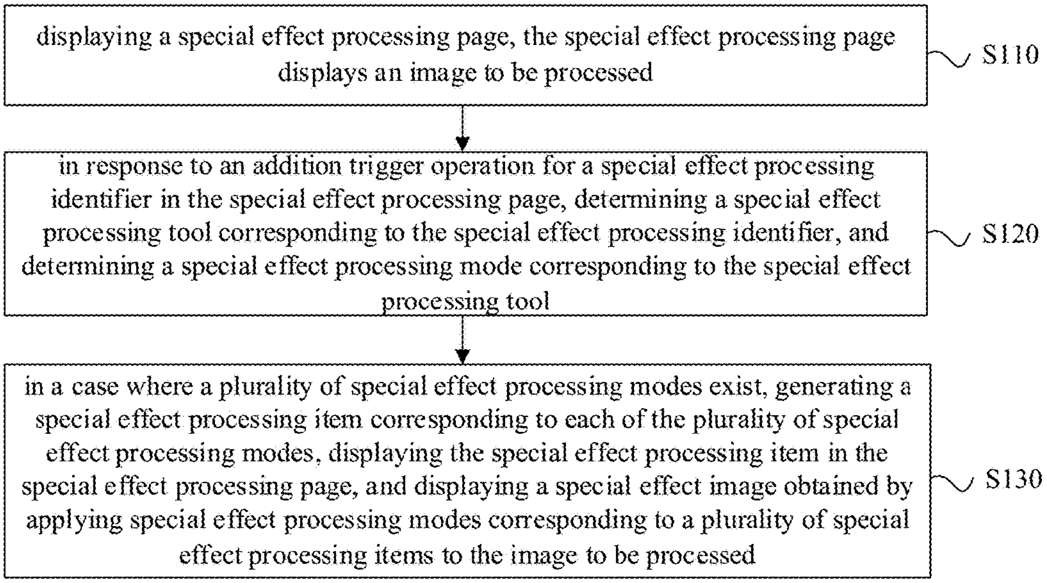
FIG. 1 is a flow diagram of an effect processing method according to an embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term “including” and its variants are open-ended including, that is, “including but not limited to”. The term “based on” is “at least partially based on”. The term “one embodiment” refers to “at least one embodiment”; the term “another embodiment” refers to “at least one other embodiment”; the term “some embodiments” refers to “at least some embodiments”. Related definitions of other terms will be given in the following description.

It should be noted that the concepts of “first” and “second” mentioned in the present disclosure are only used to distinguish different devices, modules or units, and are not used to limit the order or interdependence of the functions performed by these devices, modules or units.

It should be noted that the modifications of “a” and “a plurality” mentioned in the present disclosure are schematic rather than limiting, and those skilled in the art should understand that unless the context clearly indicates otherwise, they should be understood as “one or more”.

Names of messages or information exchanged among multiple devices in the embodiment of the present disclosure are only used for illustrative purposes, and are not used to limit the scope of these messages or information.

It can be understood that before using the technical solutions disclosed in various embodiments of the present disclosure, users should be informed of the types, scope of use, use scenarios, etc. of personal information involved in the present disclosure in an appropriate way according to relevant laws and regulations and be authorized by users.

For example, in response to receiving the user’s active request, prompt information is sent to the user to clearly remind the user that the operation requested by the user will require obtaining and using the user’s personal information. Therefore, the user can independently choose whether to provide personal information to software or hardware such as electronic devices, applications, servers or storage media that perform the operation of the technical solution of the present disclosure according to the prompt information.

As an optional but non-limiting implementation, in response to receiving the user’s active request, the way to send the prompt information to the user can be, for example, a pop-up window, in which the prompt information can be presented in text. In addition, the pop-up window can also carry options for the user to choose “agree” or “disagree” to provide personal information to the electronic device.

It can be understood that the above process of notifying and obtaining user authorization is only schematic, and does not limit the implementation of the present disclosure. Other ways to meet relevant laws and regulations can also be applied to the implementation of the present disclosure.

It can be understood that the data involved in the present technical solution (including but not limited to the data itself, data acquisition or use) shall comply with the requirements of corresponding laws, regulations and relevant regulations.

Before introducing the technical solution, the application scenario can be exemplified first. The technical solution can be applied to the information display of any effects processing tool and the scene of image processing based on the effects processing tool. For example, when the addition trigger operation for the effect processing tool is detected, the effect processing mode corresponding to the effect processing tool can be determined, and then the effect processing items corresponding to the effect processing mode are displayed in the effect processing page, and in this case, the image to be processed displayed in the effect processing page is updated to an effect image after image processing based on the effect processing tool. The existing effects processing methods usually determine the overall effects processing method corresponding to the effects processing tool, and then display the effects processing items corresponding to the overall effects processing method in the effects processing page, thus causing users to be unable to know the specific information of each effects processing method included in this type of effects processing tool, and to edit and modify the parameters of each effects processing method. In this case, based on the technical solution of the embodiment of the present disclosure, when determining the effect processing mode corresponding to the effect processing tool, under the condition that there are various effect processing modes, effect processing items corresponding to each effect processing mode can be generated respectively, and then each effect processing item can be displayed on the effect processing page, thus realizing fine-grained information display on the effect processing tool, supporting the effect of refined effect processing, increasing the flexibility of effect processing and improving the effect processing experience.

FIG. 1 is a flow diagram of an effect processing method according to an embodiment of the present disclosure. The embodiment of the present disclosure are applicable for scenarios where there are a plurality of effect processing modes for an effect processing tool to be added, and effect processing information corresponding to each of the plurality of effect processing modes is separately displayed. The method can be performed by an effect editing apparatus. The apparatus can be realized by software and/or hardware, or alternatively, by an electronic device, which can be a mobile terminal, a PC terminal or a server.

As illustrated by FIG. 1, the method provided by the present embodiment may include:

In S110, displaying an effect processing page, the effect processing page displays an image to be processed.

An apparatus performing the effect processing method provided by the embodiment of the present disclosure can be integrated in application software capable of performing effect processing on images, and the software can be installed in an electronic device. Alternatively, the electronic device can be a mobile terminal or a PC terminal. The application software can be a type of software for performing effect processing on images, and the specific application software is not detailed here, as long as effect processing of images can be realized. It can also be a specially developed application program integrated in software for performing effect processing on images, or it can be integrated in a corresponding page, and users can realize effect processing of images through the integrated page in the PC terminal.

In the present embodiment, the effect processing page may be a visual interface for performing effect processing on images. In practical application, a page display trigger operation for displaying the effect processing page can be pre-developed, so that when it is detected that the page display trigger operation is triggered, the page display trigger operation can be responded to, thereby displaying the effect processing page on the display interface. Alternatively, the page display trigger operation may include at least one of the following: triggering a page display control; receiving a page display trigger instruction; audio information including wake-up words corresponding to the page display trigger operation; and so on.

A control for triggering the display of the effect processing page can be pre-developed, and when it is detected that users trigger the control, the page display trigger operation can be responded to, so that the effect processing page can be displayed on the display interface. It should be noted that the effect processing page display control can be set on a display interface of the application software to which it belongs or in the menu list, which is not specifically limited in the embodiment of the present disclosure. For example, a click operation for the effect processing page display control in the display interface is received, and then the effect processing page is displayed in response to the click operation. Alternatively, the click operation can be a single-click operation or a multiple-click operation (e.g., a double-click operation, etc.).

In the present embodiment, the effect processing page displays the image to be processed. Here, the image to be processed can be an image that needs to be subjected to effect processing to showcase the resulting effects. The image can be a default template image, an image acquired based on a terminal device, an image obtained from a target storage space (such as an image library of application software or a terminal photo album) in response to a user operation, and an image uploaded from an external device. Alternatively, the terminal device can refer to an electronic device with the image capturing function, such as cameras, smart phones and tablet computers.

In the actual application process, in response to a selection operation for a displayed image in an image display page of a terminal device, the selected image can be taken as the image to be processed; when the trigger of a confirm control or a select control is detected, it is determined that an image display operation is triggered, and the image to be processed is displayed in the effect processing page; alternatively, a plurality of images can be pre-stored in the early development stage, and when it is detected that users trigger the image display operation, a page including at least one candidate image can be displayed based on a display interface, so that users can select from the candidate images through a trigger operation. When it is detected that users trigger any candidate image, the candidate image can be taken as the image to be processed, which is imported from the storage space into the application software to which the effect processing tool belongs and displayed in the effect processing page. Alternatively, when it is detected that users trigger the image display operation, an image uploaded to a current client by users through an external device in real time or periodically can be used as the image to be processed and displayed in the effect processing page.

In S120, in response to an addition trigger operation for an effect processing identifier in the effect processing page, an effect processing tool corresponding to the effect processing identifier is determined, and determining an effect processing mode corresponding to the effect processing tool.

In the present embodiment, the effect processing identifier can be an identifier that graphically displays the corresponding effect processing tool. Each effect processing identifier can include a text identifier and/or a graphic identifier. The text identifier can be the name of the effect tool. The graphic identifier can be a diagram of the effect corresponding to the effect processing tool. The effect processing identifier can be in any form, and for example, it can be in the form of a card with a preset shape. The effect processing tool can be a tool for processing an image or video so that the processed image or video presents a corresponding effect. Alternatively, the effect processing tool can be a tool which is built according to preset logic based on the technical means related to effect processing, such as algorithms, models or program codes, and is used for processing an image so as to make it present preset effects.

It is worth noting that each effect processing tool can contain one or more effect processing modes, and each effect processing mode can correspond to an effect. Therefore, an effect image obtained after each effect processing tool acts on the image to be processed may be a rendering of an effect, or it may be an effect image obtained by combining various effects. It should be noted that different effect processing modes can correspond to the same or different effect action objects. In other words, different effect processing modes can be used to process the same or different image regions in the image to be processed.

In the present embodiment, a control for triggering the addition of the effect processing identifier can be pre-developed, and when it is detected that users trigger the control, the addition trigger operation can be responded to, so that the effect processing tool corresponding to the effect processing identifier can be determined.

In practical application, effects corresponding to each effect processing tool can be determined in advance, corresponding effect diagrams can be made according to the effects, and the effect diagrams can be associated with the effect processing tools. Further, the corresponding effect processing identifiers can be made according to the names of each effect processing tool and the corresponding effect diagrams, then the effect processing identifiers can be associated with the effect processing tools, and the effect processing identifiers are stored in a material library of a terminal device as candidate effect processing identifiers, so that when a display trigger operation for the effect processing identifiers is detected, the pre-stored candidate effect processing identifiers can be displayed on the effect processing page, and users can select from the at least one candidate effect processing identifier through a trigger operation. When an addition trigger operation for any candidate effect processing identifier by users is detected, the candidate effect processing identifier can be used as the effect processing identifier, and the effect processing tool corresponding to the effect processing identifier can be determined.

Further, after the effect processing tool corresponding to the effect processing identifier is determined, the effect processing modes corresponding to the effect processing tool can be determined.

In the present embodiment, the effect processing mode can be a method of performing effect processing on the effect action object. The effect processing mode can specifically involve the effect action object and an effect processing operation performed on the effect action object. Here, the effect action object can be an object of effect processing based on effect processing tool. Alternatively, the effect action object can be the facial features of a user, the user's limbs, pets, plants or buildings, etc. The effect processing operation can be an operation acting on the effect action object, that is, the technical realization logic for processing the effect action object. Generally speaking, the effect processing operation is directly related to an effect presented by the effect action object. Alternatively, effect processing operations can include deformation, adding facial makeup, adding filters and adding stylized textures.

In practical application, after determining the effect processing tool corresponding to the effect processing identifier, a pre-configured configuration file corresponding to the effect processing tool can be retrieved and parsed to determine the effect processing modes corresponding to the effect processing tool based on a parsing result.

Alternatively, determining the effect processing mode corresponding to the effect processing tool includes: acquiring an annotation protocol corresponding to the effect processing tool, and parsing the annotation protocol to acquire key parameters in the annotation protocol; and determining the effect processing modes corresponding to the effect processing tool based on the key parameters.

Here, the annotation protocol can be a pre-written program code based on a preset architecture, which can be used to explain the specific implementation of the effect processing tool, and can also be understood as a configuration file generated in the development stage of the effect processing tool, which can include annotations on various parameters associated with the effect processing tool. In practical application, in the development stage of the effect processing tool, after the development of the effect processing tool is completed, an annotation protocol corresponding to the effect processing tool can be generated according to the effect action object corresponding to the effect processing tool or the effect to be presented, and stored corresponding to the effect processing tool, for example, the annotation protocol can be stored in a package file corresponding to the effect processing tool, so that the annotation protocol corresponding to the effect processing tool can be retrieved from the package file corresponding to the effect processing tool in the application stage of the effect processing tool.

In the present embodiment, the key parameters may be predetermined parameters corresponding to the effect processing modes in the effect processing tool. There are many types of key parameters. For example, the key parameters may be parameters for indicating the effect processing object and/or output parameters of the effect processing tool. It should be noted that the number of obtained key parameters is equal to the number of effect processing modes included in the effect processing tool, for example, if the number of key parameters of the same type parsed from the annotation protocol corresponding to the effect processing tool is one, the number of effect processing modes corresponding to the effect processing tool is one; and if the number of key parameters of the same type parsed from the annotation protocol corresponding to the effect processing tool is two or more, the number of effect processing modes corresponding to the effect processing tool is two or more.

In the concrete implementation, after determining the effect processing tool corresponding to the addition trigger operation, the annotation protocol corresponding to the effect processing tool can be obtained from a code file corresponding to the effect processing tool, and then the obtained annotation protocol can be parsed based on a preset parsing program, so that the key parameters in the annotation protocol can be obtained. Further, the effect processing modes corresponding to the effect processing tool can be determined according to the obtained key parameters. The advantages of this approach are that the effect processing modes corresponding to the effect processing tool can be quickly determined, and at the same time, it ensures the information integrity of the effect processing tool, thus improving the effect processing efficiency.

As mentioned above, an effect processing tool can include one effect processing mode or a plurality of effect processing modes, which is not specifically limited in the embodiment of the present disclosure.

In S130, in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

Here, the effect processing item can be an information item that provides an interactive operation corresponding to the effect processing mode in the effect processing tool, and can also be understood as an operation entrance for users to interact with the effect processing mode. In practical application, based on the effect processing items, users can provide interactive operations supported by effect processing modes associated with the effect processing items, so as to edit related information of the effect processing modes through the interactive operations.

In the present embodiment, there may be one effect processing mode or a plurality of effect processing modes in the effect processing tool corresponding to the addition trigger operation. In the case of one effect processing mode, the effect processing item corresponding to the effect processing tool can be directly generated and displayed in the effect processing page. In the case of a plurality of effect processing modes, in order to enable fine-grained information display for the effect processing tool so that users can interact with each effect processing mode included in the effect processing tool, effect processing items corresponding to each effect processing mode can be generated, and each generated effect processing item can be displayed in the effect processing page.

In practical application, in response to there being a plurality of effect processing modes in the effect processing tool, effect processing items corresponding to the effect processing modes can be generated according to pre-deployed effect processing item generation logic, and the generated effect processing items can be displayed in an effect processing interface. For example, each effect processing mode in the effect processing tool can be determined by parsing the annotation protocol of the effect processing tool. Further, interactive items corresponding to each effect processing mode can be parsed, and the effect processing items corresponding to the effect processing modes can be generated based on the parsed effect processing modes and their corresponding interactive items.

It should be noted that when displayed in the effect processing interface, the effect processing items can be displayed based on a predetermined default display order or a display order set by users. Alternatively, the default display order may be a generation time stamp order of the effect processing items, a parsing order of the key parameters corresponding to the effect processing modes in the annotation protocol, or a preset effect action order of the effect processing modes applied to the image to be processed, which is not specifically limited in the present embodiment.

Further, while displaying the plurality of generated effect processing items in the effect processing page, an effect image obtained by applying the effect processing modes corresponding to the plurality of the effect processing items to the image to be processed in a superimposing manner can be displayed.

Here, the effect image can be an image obtained after effect processing of the image to be processed. It can be understood that in the case of a plurality of effect processing modes in the effect processing tool, the effect image can be an image obtained by applying the plurality of effect processing modes to the image to be processed, that is, the effect image can be an image matching an effect obtained by superimposing the effects corresponding to the plurality of effect processing modes.

In practical application, a display effect corresponding to the effect image can correspond to a display order of the effect processing items in the effect processing page. Therefore, when generating the effect image, the display order of the plurality of effect processing items in the effect processing page can be determined first, and then an effect action order of the effect processing modes corresponding to the effect processing items applied to the image to be processed can be determined according to the determined display order, so as to obtain the effect image after the plurality of effect processing modes are applied to the image to be processed.

Alternatively, displaying an effect image obtained by applying the effect processing modes corresponding to the plurality of effect processing items to the image to be processed includes: in response to a plurality of effect processing items being displayed in the effect processing page, determining the effect image corresponding to the image to be processed based on a relative display order of the plurality of effect processing items.

In the present embodiment, the relative display order can be understood as a relative positional relationship between the display position of any effect processing item and the display positions of other effect processing items. For example, if there are three effect processing items, namely, effect processing item 1, effect processing item 2 and effect processing item 3, and the display order of the three effect processing items can be effect processing item 2, effect processing item 1 and effect processing item 3, then the relative display order of the three effect processing items can be that the effect processing item 2 is in front of the effect processing item 1, the effect processing item 1 is behind the effect processing item 2 and in front of the effect processing item 3, and the effect processing item 3 is behind the effect processing item 1.

It should be noted that the relative display order of the plurality of effect processing items can be defined from the order between any two effect processing items, that is, the display order of one effect processing item relative to another effect processing item. It should also be noted that the display order of one effect processing item relative to another effect processing item includes not only the case that the two effect processing items are in adjacent display positions, but also the case that the two effect processing items are not in adjacent display positions, that is, other effect processing items can be added between the two effect processing items without changing the relative display order of the two effect processing items.

It should be noted that the relative display order of the plurality of effect processing items can be a preset default relative display order or a user-defined relative display order. Alternatively, the default relative display order may be a generation time stamp order of the effect processing items, a parsing order of the key parameters corresponding to the effect processing modes in the annotation protocol, or a preset effect action order of the effect processing modes applied to the image to be processed, which is not specifically limited in the present embodiment.

In practical application, in response to a plurality of effect processing items being displayed in the effect processing page, the relative display order of the plurality of effect processing items can be determined, and then the effect action order of the effect processing modes corresponding to the plurality of effect processing items can be determined according to the determined relative display order, so that the effect processing modes corresponding to the plurality of effect processing items can be applied to the image to be processed for effect processing according to the determined effect action order, so as to obtain the effect image. The advantages of this approach are that the correlation between the effect image and the plurality of effect processing modes is enhanced, and at the same time, it ensures the display effect of the effect image and improves the flexibility of effect processing.

Alternatively, determining the effect image corresponding to the image to be processed based on a relative display order of the plurality of effect processing items includes: processing the image to be processed by sequentially adopting the effect processing modes corresponding to the plurality of effect processing items according to the relative display order of the plurality of effect processing items, so as to obtain the effect image.

In the present embodiment, the image to be processed being processed in sequence can be understood as an image to be processed corresponding to the subsequent effect processing item being an intermediate image obtained after the preceding effect processing item processes a corresponding image to be processed, or it can be understood as an image obtained after the preceding effect processing item processes a corresponding image to be processed being an image for the subsequent effect processing item to process. Here, the intermediate image is an effect image obtained after the image to be processed is processed by the effect processing modes corresponding to each effect processing item arranged before the last effect processing item.

In practical application, after determining the relative display order of the plurality of effect processing items, the relative display order can be taken as the effect action order of the effect processing modes corresponding to the effect processing items, and then, the image to be processed can be processed by sequentially adopting the effect processing modes corresponding to the plurality of effect processing items according to the determined relative display order of the effect processing items. Specifically, an image input of the effect processing mode corresponding to the first effect processing item determined according to the relative display order can be an image to be processed, and its corresponding image output can be an intermediate image obtained after processing based on the effect processing mode. Then, the intermediate image is regarded as an image to be processed corresponding to the next effect processing item determined according to the relative display order, and so on, until the processing of an image to be processed corresponding to the effect processing mode corresponding to the last effect processing item determined according to the relative display order is finished, so that the effect image can be obtained. The advantages of this approach are that the correlation between the effect image and the plurality of effect processing modes is enhanced, and the display effect of the effect image is ensured.

In the related art, after adding the effect processing tool to the effect processing page, a tool identifier corresponding to the effect processing tool is displayed in the effect processing interface, but it is often difficult for users to identify specific effect processing information included in the corresponding effect processing tool through the displayed tool identifier. In particular, for an effect processing tool including a plurality of effect processing modes, users cannot know the specific information of each effect processing mode included in this type of effect processing tool. Based on this, by applying the technical solution provided by the present embodiment, under the condition that the effect processing tool has a plurality of effect processing modes, effect processing items corresponding to the plurality of effect processing modes can be generated, so as to provide an interactive entrance for users to edit the effect processing modes, and at the same time, users can know the effect processing modes corresponding to the effect processing items used to present the current effect image and the effect action order of the plurality of effect processing modes.

Figure 2:
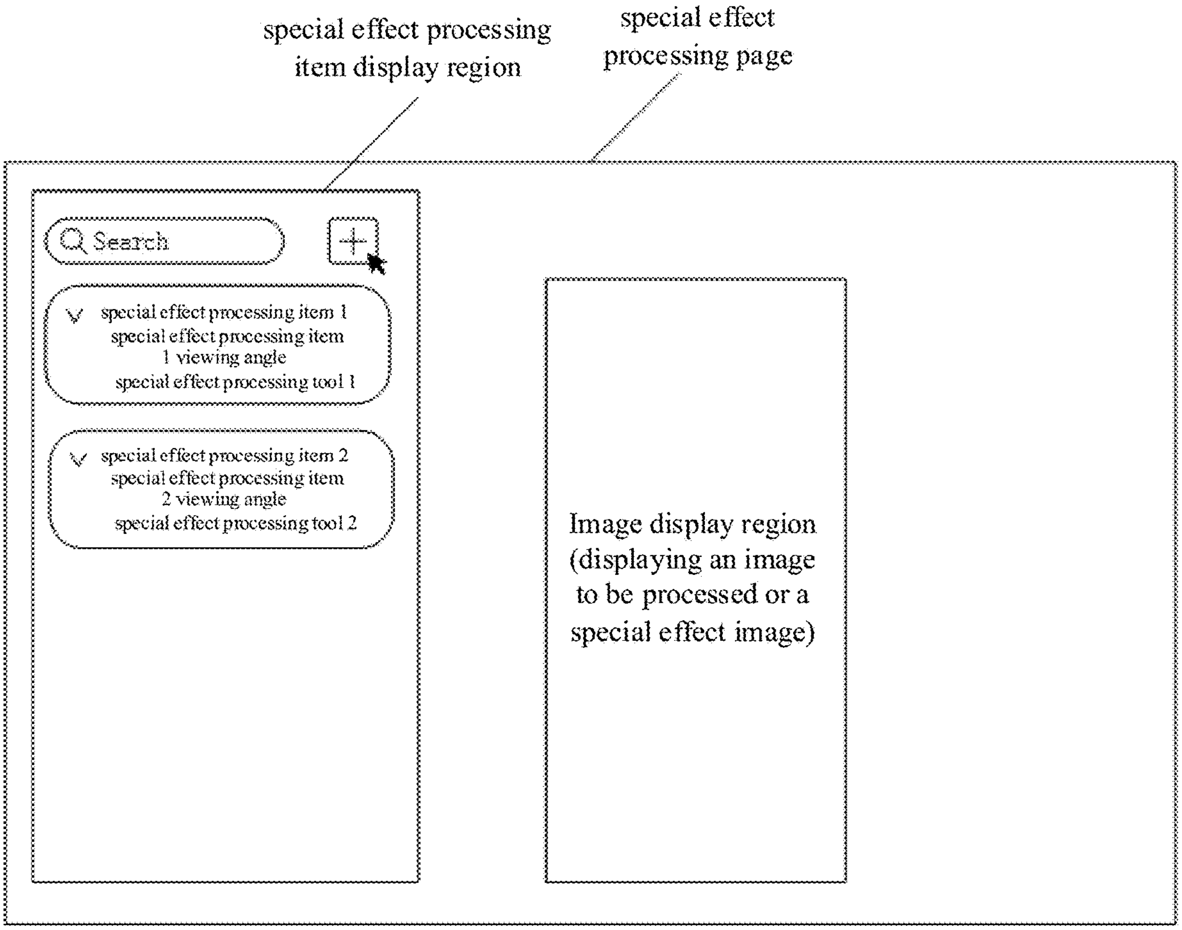
FIG. 2 is a schematic diagram of an effect processing page according to an embodiment of the present disclosure.

As illustrated by FIG. 2 which is a schematic diagram of an effect processing page, the effect processing page includes an effect processing item display region and an image display region. An image displayed in the image display region is the image to be processed when no effect processing tool is added. The effect processing item display region can include an addition trigger control "+". When a mouse cursor (arrow in the figure) inputs a trigger operation towards the control "+", a plurality of candidate effect processing identifiers can be displayed. When it is detected that a trigger operation for any candidate effect processing identifier, the candidate effect processing identifier can be used as the effect processing identifier, and the effect processing tool corresponding to the effect processing identifier can be determined. For example, an effect processing tool corresponding to the addition trigger operation is an effect processing tool 1, which includes two effect processing modes, then an effect processing item 1 and an effect processing item 2 can be generated accordingly and displayed in the effect processing page, and an effect image displayed in the image display region of the effect processing page is an image obtained by sequentially applying the effect processing mode corresponding to the effect processing item 1 and the effect processing mode corresponding to the effect processing item 2 to the image to be processed.

Assuming that the effect processing tool 1 includes an effect processing model, the effect processing model can correspond to two output results, and each output result corresponds to an effect processing mode. For example, the effect processing tool can be an effect processing tool including a generative adversarial network (GAN) model. The GAN model can correspond to a texture stylization output result and a facial deformation output result. Therefore, the effect processing item 1 corresponding to the effect processing tool 1 can be an effect processing item corresponding to a stylization processing mode, the effect processing item 2 corresponding to the effect processing tool 1 can be an effect processing item corresponding to a deformation processing mode, and the effect image can be an image obtained after texture stylization and facial deformation processing of a target object included in the image to be processed.

It should be noted that if the relative display order of the plurality of effect processing items is the same as the predetermined effect action order of the plurality of effect processing modes included in the effect processing tool, that is, the preset default relative display order, the finally generated effect image can be an image matching the effect to be presented by the effect processing tool. If the relative display order of the plurality of effect processing items is inconsistent with the preset default display order, the effect image corresponding to the image to be processed can be determined based on the currently determined relative display order of the plurality of effect processing items, and there may be differences between the determined effect image and the effect to be presented by the effect processing tool.

It should also be noted that after the plurality of effect processing items are displayed in the effect processing page based on the determined relative display order, and the corresponding effect processing image is obtained, the determined relative display order can be changed based on an order change trigger operation input by users. In this case, the effect image can be updated according to the changed relative display order into an image obtained after the image to be processed is subjected to effect processing based on the changed action order of the effect processing modes.

In the actual application process, in response to there being a plurality of effect processing modes, the effect image displayed in the effect processing page is obtained by processing the image to be processed based on the plurality of effect processing modes. In order to allow users to understand the image processing effect of one or part of the effect processing modes on the image to be processed, an editing trigger operation can be input for the plurality of effect items displayed in the effect processing page, so as to determine the effect image corresponding to the image to be processed based on the received editing trigger operation.

In the concrete implementation, the effect processing items displayed in the effect processing page correspond to the effect processing modes acting on the image to be processed. Therefore, to determine the image processing effect of one or part of the effect processing modes on the image to be processed, a target effect processing item can be first determined from the plurality of effect processing items as displayed, and further, other effect processing items than the target effect processing item can be deleted from the effect processing page, or display parameters of other effect processing items can be set to a hidden state, so that other effect processing items can be displayed in the effect processing page in an invisible manner, and then the effect image displayed in the effect processing page is the image obtained after the effect processing mode corresponding to the target effect processing item acts on the image to be processed.

According to the technical solution of the embodiment of the present disclosure, by displaying the effect processing page, an interactive entrance for effect processing is provided for users. Further, in response to the addition trigger operation for the effect processing identifier in the effect processing page, the effect processing tool corresponding to the effect processing identifier is determined, and the effect processing modes corresponding to the effect processing tool are determined, so that the editing intention of users on the effect processing tool can be accurately captured, so as to quickly determine the effect processing modes corresponding to the effect processing tool. Finally, under the condition that a plurality of effect processing modes exist, effect processing items corresponding to each effect processing mode are generated, the effect processing items are displayed in the effect processing page, and the effect image obtained by applying the effect processing modes corresponding to the plurality of effect processing items to the image to be processed is displayed, thus solving the technical problem of limited interaction modes and display effects in the related art, realizing fine-grained information display for effect processing tools, supporting refined effects processing effects, increasing the flexibility of effect processing and improving the experience of effect processing.

Figure 3:
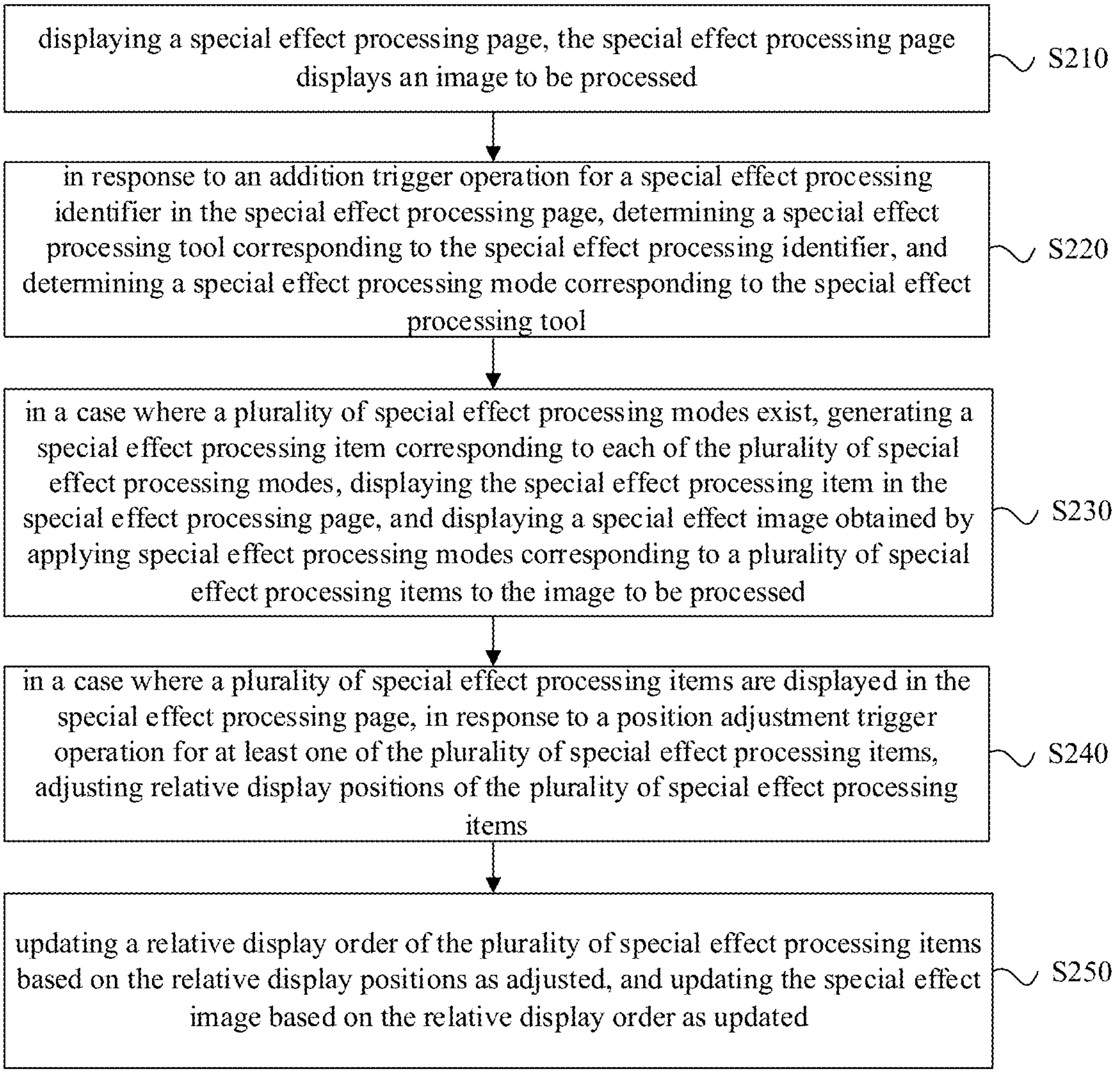
FIG. 3 is a flow diagram of another effect processing method according to an embodiment of the present disclosure.

FIG. 3 is a flow diagram of another effect processing method according to an embodiment of the present disclosure. On the basis of the above embodiment, the technical solution of the present embodiment can also input a position adjustment trigger operation for the effect processing items as displayed after the effect processing items are displayed in the effect processing page, so as to adjust the relative display order of the effect processing items based on the position adjustment trigger operation, and then update the effect image according to the adjusted relative display order. Detailed implementation can be found in the description of the present embodiment. The same or similar technical features as those in the previous embodiments are not repeated here.

As illustrated by FIG. 3, the method provided by the present embodiment may include the following steps.

In S210, displaying an effect processing page, and the effect processing page displays an image to be processed.

In S220, in response to an addition trigger operation for an effect processing identifier in the effect processing page, an effect processing tool corresponding to the effect processing identifier is determined, and determining an effect processing mode corresponding to the effect processing tool.

In S230, in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

In S240, in response to a plurality of effect processing items being displayed in the effect processing page, in response to a position adjustment trigger operation for at least one of the plurality of effect processing items, adjusting relative display positions of the plurality of effect processing items.

In the present embodiment, the effect processing items can be set to an adjustable state in advance, and in response to at least one effect processing item being selected, position adjustment can be performed on the selected effect processing items. The relative display position can be a display position of any effect processing item in the effect processing page in relation to the display positions of other effect processing items in the effect processing page.

It should be noted that the process of responding to the position adjustment trigger operation for one effect processing item is similar to the process of responding to the position adjustment trigger operation for multiple effect processing items. Below is an illustration of the process of responding to the position adjustment trigger operation for one effect processing item.

In the practical application process, the position adjustment trigger operation for one effect processing item can be any operation acting on the effect processing item.

Alternatively, a drag operation for the effect processing item is input based on an input device or a touch point. Specifically, users can input a selection trigger operation for any effect processing item displayed in the effect processing page based on the input device or the touch point to update the effect processing item to a selected state. Further, in response to the effect processing item being in the selected state, the effect processing item is controlled to move in an effect processing item display region included in the effect processing page. When it is detected that a pause of the effect processing item at any position in the effect processing item display region reaches preset duration, the position can be taken as an adjusted display position of the effect processing item. Further, the relative display positions of the plurality of effect processing items can be adjusted according to the position adjustment trigger operation for the effect processing item.

Alternatively, the position adjustment trigger operation for one effect processing item can also be a position editing operation for the effect processing item input based on the input device or the touch point. Specifically, users can input a selection trigger operation for any effect processing item displayed in the effect processing page based on the input device or the touch point. In response to the selection trigger operation, an edit box pops up in the effect processing page. The edit box can include a current display position of the selected effect processing item, a position editing item for an adjusted display position and an adjustment confirm control. Users can input a position editing operation for the editing item, so as to display the adjusted display position of the selected effect processing item based on the editing item. When it is detected that a trigger operation for the adjustment confirm control, the selected effect processing item can be adjusted from the current display position to a display position shown in the position editing item, and then the relative display positions of the plurality of effect processing items can be adjusted according to the position adjustment trigger operation for the effect processing item.

In the specific implementation, in response to a plurality of effect processing items being displayed in the effect processing page, when it is detected that a position adjustment trigger operation is input for one or more effect processing items, the display position of the selected effect processing item can be adjusted in response to the position adjustment trigger operation, and further, the relative display positions of the plurality of effect processing items displayed in the effect processing page can be adjusted. For example, still referring to the above example, the three effect processing items displayed in the effect processing page are arranged in the display order of the effect processing item 2, the effect processing item 1 and the effect processing item 3, if the position adjustment trigger operation is input for the effect processing item 1 and the effect processing item 1 is adjusted to the first place, then the relative display positions of the three effect processing items will change accordingly, that is, the relative display position of the effect processing item 1 is adjusted from the middle position among the three effect processing items to the first position, the relative display position of the effect processing item 2 is adjusted from the first position among the three effect processing items to the middle position, and the relative display position of the effect processing item 3 is still the last position among the three effect processing items.

In S250, updating a relative display order of the plurality of effect processing items based on the relative display positions as adjusted, and updating the effect image based on the relative display order as updated.

In the present embodiment, after determining the relative display positions as adjusted of the plurality of effect processing items, the relative display order of the plurality of effect processing items can be updated based on the relative display positions as adjusted, so that the effect image can be updated based on the relative display order as updated.

In practical application, after determining the relative display positions as adjusted of the plurality of effect processing items, the plurality of effect processing items displayed in the effect processing page can be reordered according to the relative display positions as adjusted, so as to update the relative display order of the effect processing items, and then the effect image can be updated based on the relative display order as updated.

According to the technical solution of the embodiments of the present invention, the effect processing page is displayed, and then in response to the addition trigger operation for the effect processing identifier in the effect processing page, the effect processing tool corresponding to the effect processing identifier is determined, and the effect processing modes corresponding to the effect processing tool are determined. Further, under the condition that a plurality of effect processing modes exist, effect processing items corresponding to each effect processing mode are generated, the effect processing items are displayed in the effect processing page, and the effect image obtained by applying the effect processing modes corresponding to the plurality of effect processing items to the image to be processed is displayed. Finally, under the condition that a plurality of effect processing items are displayed in the effect processing page, the relative display positions of the plurality of effect processing items are adjusted in response to a position adjustment trigger operation for at least one effect processing item. The relative display order of the plurality of effect processing items is updated based on the relative display positions as adjusted, and the effect image is updated based on the relative display order as updated, thus allowing users to flexibly edit the display positions of the effect processing items, enriching the combined processing modes of various effect processing modes, enhancing the flexibility of effect processing and enriching the display effect of the effect image.

Figure 4:
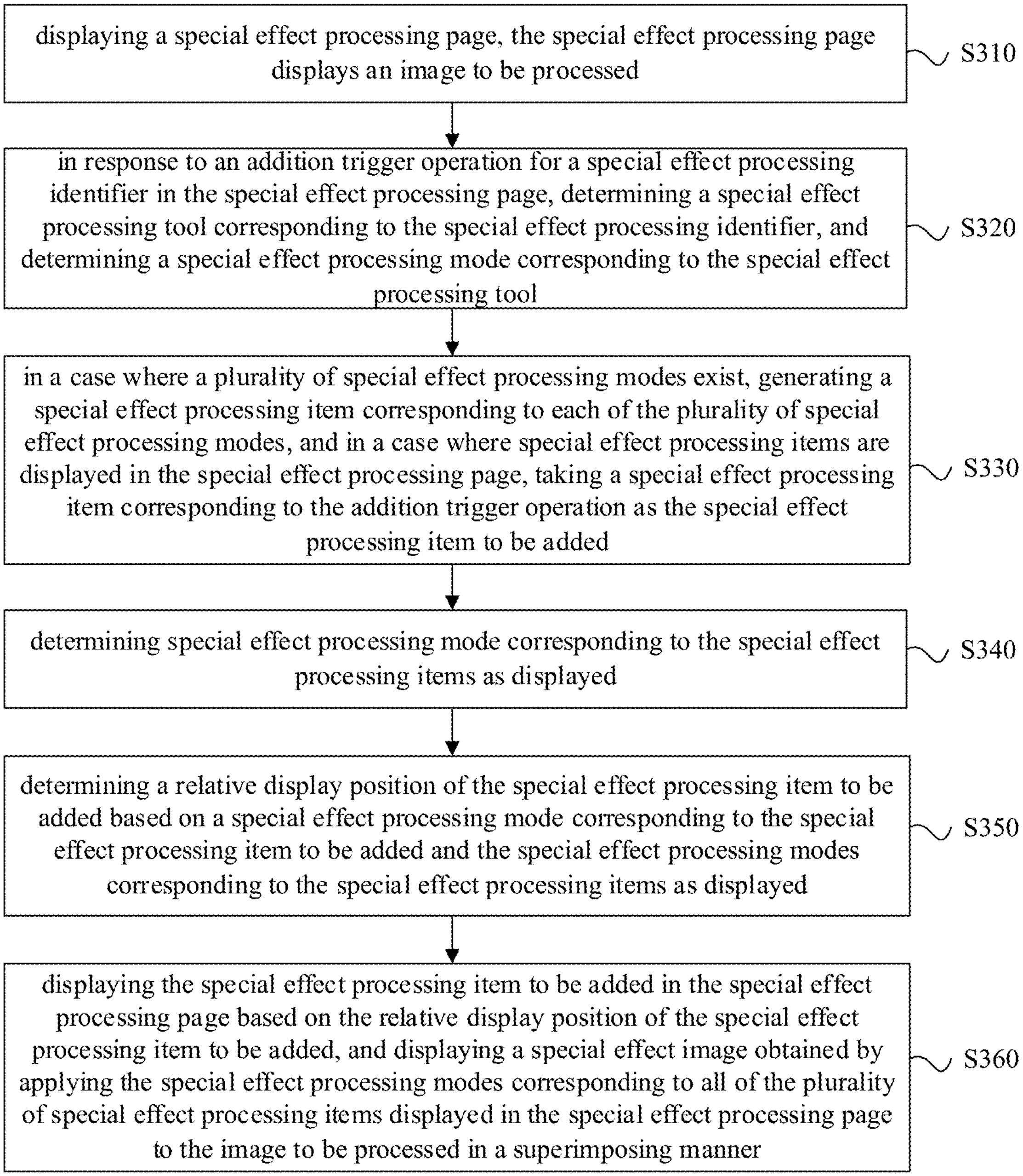
FIG. 4 is a flow diagram of another effect processing method according to an embodiment of the present disclosure.

FIG. 4 is a flow diagram of another effect processing method according to an embodiment of the present disclosure. On the basis of the above embodiment, the technical solution of the present embodiment can, under the condition that effect processing items are displayed in the effect processing page, upon displaying an effect processing item corresponding to an addition trigger operation in the effect processing page, determine a relative display position of the effect processing item corresponding to the addition trigger operation according to the effect processing modes corresponding to the effect processing items as displayed and the effect processing mode of the effect processing item corresponding to the addition trigger operation, so as to display the effect processing item in the effect processing page based on the determined relative display position. Detailed implementation can be found in the description of the present embodiment. The same or similar technical features as those in the previous embodiments are not repeated here.

As illustrated by FIG. 4, the method provided by the present embodiment may include the following steps.

In S310, displaying an effect processing page, the effect processing page displays an image to be processed.

In S320, in response to an addition trigger operation for an effect processing identifier in the effect processing page, an effect processing tool corresponding to the effect processing identifier is determined, and determining an effect processing mode corresponding to the effect processing tool.

In S330, in response to a plurality of effect processing modes existing, generating an effect processing item corresponding to each of the plurality of effect processing modes, and in response to effect processing items being displayed in the effect processing page, taking an effect processing item corresponding to the addition trigger operation as the effect processing item to be added.

In practical application, upon obtaining the effect processing item corresponding to the addition trigger operation and displaying the effect processing item in the effect processing interface, the effect processing item corresponding to the addition trigger operation can be processed according to whether effect processing items have already been displayed in the effect processing page. Here, the effect processing items displayed in the effect processing page can be effect processing items corresponding to effect processing tools that have been added.

In the concrete implementation, under the condition that the effect processing tool corresponding to the addition trigger operation has a plurality of effect processing modes, effect processing items corresponding to each effect processing mode can be generated, and then, under the condition that effect processing items are displayed in the effect processing page, the effect processing item corresponding to the addition trigger operation can be taken as an effect processing item to be added. Further, the image to be processed can be processed according to the effect processing item to be added and the effect processing items as displayed, so as to obtain an effect image.

In S340, determining effect processing mode corresponding to the effect processing items as displayed.

In practical application, under the condition that effect processing items are displayed in the effect processing page, the effect processing modes corresponding to the effect processing items as displayed can be determined. Specifically, effect action objects corresponding to the effect processing items as displayed and effect processing operations performed on the effect action objects are determined.

In S350, determining a relative display position of the effect processing item to be added based on an effect processing mode corresponding to the effect processing item to be added and the effect processing modes corresponding to the effect processing items as displayed.

In practical application, after determining the effect processing mode corresponding to the effect processing item to be added and the effect processing modes corresponding to the effect processing items as displayed, the relative display position of the effect processing item to be added can be determined according to an effect action object and a corresponding effect processing operation included in the effect processing mode corresponding to the effect processing item to be added and the effect action objects and the corresponding effect processing operations included in the effect processing modes corresponding to the effect processing items as displayed.

In the concrete implementation, under the condition that the effect action object included in the effect processing mode corresponding to the effect processing item to be added is the same as that included in the effect processing mode corresponding to the displayed effect processing item, the relationship between the effect processing operation included in the effect processing mode corresponding to the effect processing item to be added and the effect processing operation included in the effect processing mode corresponding to the added effect processing item can be determined. If there is no correlation between the effect processing operation corresponding to the effect processing item to be added and the effect processing operation corresponding to the displayed effect processing item, the relative display position of the effect processing item to be added can be determined according to a preset display order of the processing items. For example, if the effect processing operation corresponding to the displayed effect processing item is a deformation operation and the effect processing operation corresponding to the effect processing item to be added is a filter adding operation, it indicates that there is no correlation between the effect processing operation corresponding to the effect processing item to be added and the effect processing operation corresponding to the displayed effect processing item, so the relative display position of the effect processing item to be added can be determined according to the preset display order of the processing items. If there is a correlation between the effect processing operation corresponding to the effect processing item to be added and the effect processing operation corresponding to the displayed effect processing item, the relative display position of the effect processing item to be added can be determined based on the correlation. For example, if the effect processing operation corresponding to the displayed effect processing item is a deformation operation, and the effect processing operation corresponding to the effect processing item to be added is a makeup adding operation, it indicates that there is a correlation between the effect processing operation corresponding to the effect processing item to be added and the effect processing operation corresponding to the displayed effect processing item, so the relative display position of the effect processing item to be added corresponding to the makeup adding operation can be determined as the previous position of the displayed effect processing item corresponding to the deformation operation based on the correlation.

In the concrete implementation, under the condition that the effect action object included in the effect processing mode corresponding to the effect processing item to be added is different from that included in the effect processing mode corresponding to the displayed effect processing item, the relative display position of the effect processing item to be added can be determined according to the preset display order of the processing items. Alternatively, the relative display position of the effect processing item to be added can be determined according to an addition time stamp of the effect processing item, that is, the effect processing items to be added are sequentially arranged after the displayed last effect processing item.

In S360, displaying the effect processing item to be added in the effect processing page based on the relative display position of the effect processing item to be added, and displaying an effect image obtained by applying the effect processing modes corresponding to all of the plurality of effect processing items displayed in the effect processing page to the image to be processed in a superimposing manner.

In practical application, after determining the relative display position of the effect processing item to be added, the corresponding effect processing item to be added can be displayed in the effect processing page according to the determined relative display position, and at the same time, the relative display order of all the effect processing items displayed in the effect processing page can be determined. Further, the image to be processed is processed by sequentially adopting the effect processing modes corresponding to the plurality of effect processing items according to the relative display order of all the effect processing items as displayed, so that the effect image can be obtained.

Figure 5:
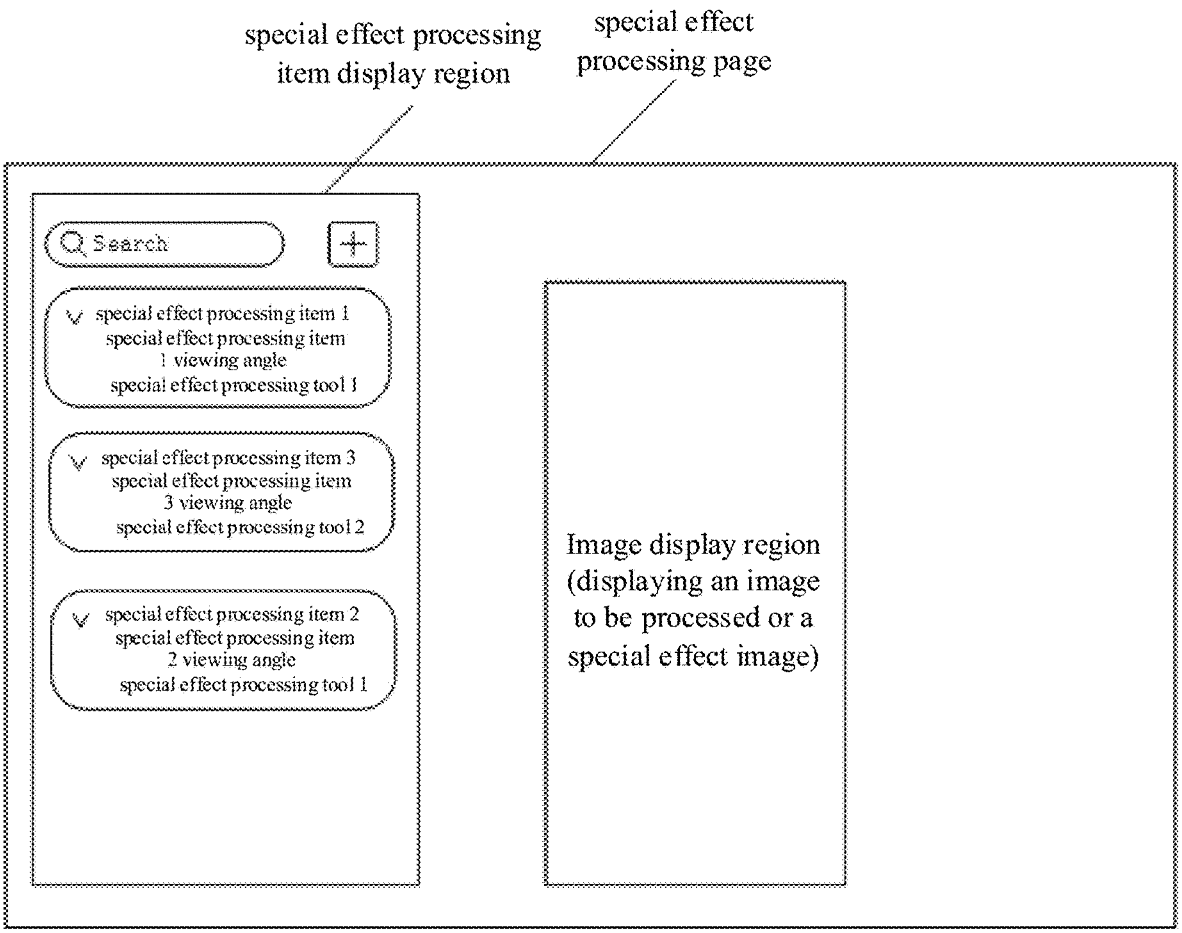
FIG. 5 is a schematic diagram of an effect processing page according to an embodiment of the present disclosure.

As illustrated by FIG. 5, under the condition that the effect processing item 1 and the effect processing item 2 corresponding to the effect processing tool 1 are displayed in the effect processing page, when it is detected that a trigger operation for an effect processing tool 2, it is determined that the effect processing tool 2 corresponds to one effect processing mode, and the effect processing item 3 corresponding to the effect processing mode is generated. Further, based on the effect processing mode corresponding to the effect processing item 1, the effect processing mode corresponding to the effect processing item 2 and the effect processing mode corresponding to the effect processing item 3, it is determined that the relative display position of the effect processing item 3 can be located between the effect processing item 1 and the effect processing item 2, and the three effect processing items are displayed in the relative display order of the effect processing item 1, the effect processing item 3 and the effect processing item 2. Meanwhile, the effect image displayed in the image display region of the effect processing page is an image obtained by sequentially applying the effect processing mode corresponding to the effect processing item 1, the effect processing mode corresponding to the effect processing item 3 and the effect processing mode corresponding to the effect processing item 2 to the image to be processed.

Still referring to the above example, the effect processing tool 1 is an effect processing tool including a GAN model, the effect processing item 1 corresponding to the effect processing tool 1 can be an effect processing item corresponding to the texture stylization processing mode, and the effect processing item 2 corresponding to the effect processing tool 1 can be an effect processing item corresponding to the facial deformation processing mode. Assuming that the effect processing tool 2 is a makeup texture effect processing tool, the applied makeup texture is generated based on a standard facial model, and the standard facial model matches the original facial morphology of a user. Because the effect processing mode corresponding to the effect processing item 2 is to deform the user's face, if the effect processing item 3 is added after the effect processing item 2 according to a default addition time of the effect processing tool, the makeup texture will be added after the facial deformation, resulting in a poor matching effect between the deformed face and the makeup texture corresponding to the effect processing item 3. Based on the technical solution of the embodiment of the present disclosure, the relative display position of the effect processing item 3 can be determined to be in front of the effect processing item 2, that is, the makeup texture effect processing is performed before the facial deformation processing. In this case, the effect image can be an image obtained by sequentially performing texture stylization processing, makeup texture processing and facial deformation processing on the target object included in the image to be processed, and the effect action object of the facial deformation processing will be the stylized face plus the makeup texture, so that the matching effect between the face and the makeup texture in the effect image is better.

According to the technical solution of the embodiments of the present invention, the effect processing page is displayed, and then in response to the addition trigger operation for the effect processing identifier in the effect processing page, the effect processing tool corresponding to the effect processing identifier is determined, and the effect processing modes corresponding to the effect processing tool are determined. Further, under the condition that a plurality of effect processing modes exist, effect processing items corresponding to each effect processing mode are generated, and in response to effect processing items being displayed in the effect processing page, an effect processing item corresponding to the addition trigger operation is taken as the effect processing item to be added, and the effect processing modes corresponding the effect processing items as displayed are determined. The relative display position of the effect processing item to be added is determined based on the effect processing mode corresponding to the effect processing item to be added and the effect processing modes corresponding to the effect processing items as displayed. Finally, the effect processing item to be added is displayed in the effect processing page based on the relative display position of the effect processing item to be added, and the effect image obtained by applying the effect processing modes corresponding to all of the plurality of effect processing items displayed in the effect processing page to the image to be processed in a superimposing manner is displayed. In this way, the effect of flexibly determining the relative display position of the effect processing item to be added under the condition that the effect processing items are already displayed in the effect processing page is realized, and further, the display effect of the effect image is improved, and the effect processing experience is improved for users.

Figure 6:
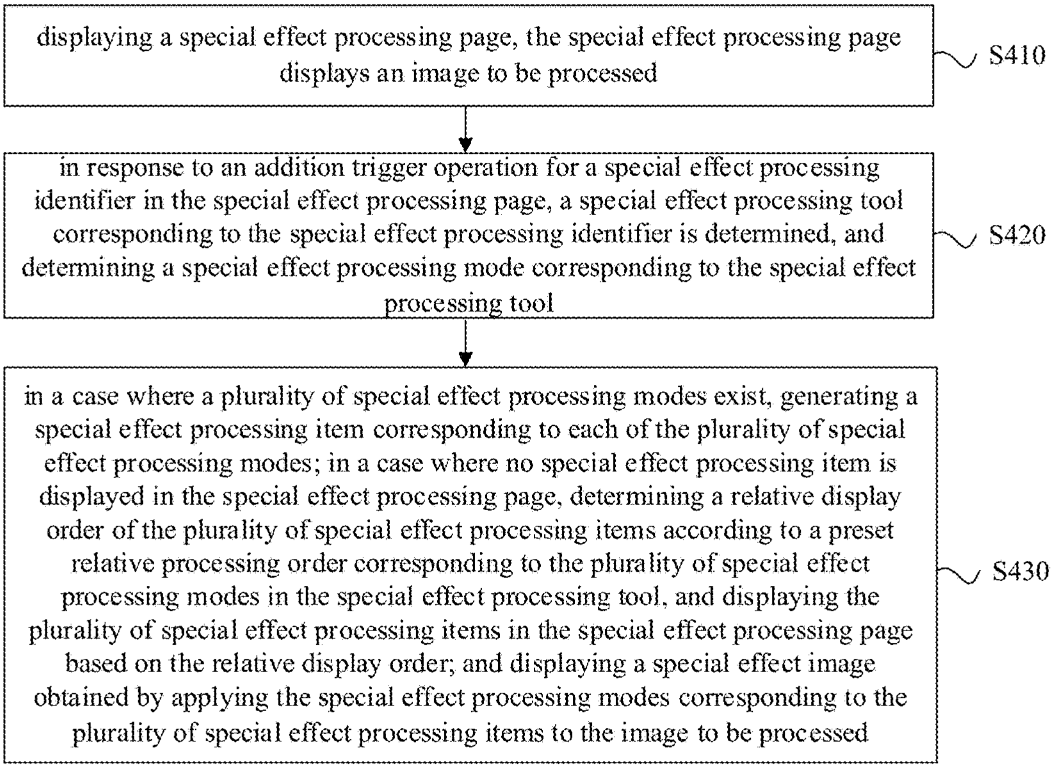
FIG. 6 is a flow diagram of another effect processing method according to an embodiment of the present disclosure.

FIG. 6 is a flow diagram of another effect processing method according to an embodiment of the present disclosure. On the basis of the above embodiment, the technical solution of the present embodiment can, under the condition that no effect processing item is displayed in the effect processing page, upon displaying an effect processing item corresponding to an addition trigger operation in the effect processing page, determine a relative display order of a plurality of effect processing items according to a relative processing order of a plurality of effect processing modes corresponding to the addition trigger operation, so as to display the effect processing item in the effect processing page based on the determined relative display position. Detailed implementation can be found in the description of the present embodiment. The same or similar technical features as those in the previous embodiments are not repeated here.

As illustrated by FIG. 6, the method provided by the present embodiment may include the following steps.

In S410, displaying an effect processing page, the effect processing page displays an image to be processed.

In S420, in response to an addition trigger operation for an effect processing identifier in the effect processing page, an effect processing tool corresponding to the effect processing identifier is determined, and determining an effect processing mode corresponding to the effect processing tool.

In S430, in response to a plurality of effect processing modes existing, generating an effect processing item corresponding to each of the plurality of effect processing modes; in response to no effect processing item being displayed in the effect processing page, determining a relative display order of the plurality of effect processing items according to a preset relative processing order corresponding to the plurality of effect processing modes in the effect processing tool, and displaying the plurality of effect processing items in the effect processing page based on the relative display order; and displaying an effect image obtained by applying the effect processing modes corresponding to the plurality of effect processing items to the image to be processed.

In the present embodiment, the relative processing order can be a preset order in which the plurality of effect processing modes are applied to the image to be processed. The relative processing order corresponding to the plurality of effect processing modes in the effect processing tool can be an order for any effect processing mode in the effect processing tool to perform image processing on the image to be processed relative to other effect processing modes.

In practical application, in the development stage of the effect processing tool, under the condition that the effect processing tool has a plurality of effect processing modes, an optimal effect diagram obtained after processing images or videos based on the effect processing tool can be determined, and the effect displayed in the diagram can be the best effect that can be realized by the effect processing tool. Further, according to the optimal effect diagram, a relative processing order of the plurality of effect processing modes included in the effect processing tool when generating the optimal effect diagram is determined, and the determined relative processing order is stored in a code file of the effect processing tool, so that the stored relative processing order can be called in the subsequent application stage.

In practical application, under the condition that no effect processing item is displayed in the effect processing page, a preset relative processing order corresponding to the plurality of effect processing modes in the effect processing tool can be obtained and used as the relative display order of the effect processing items corresponding to the plurality of effect processing modes. Further, the plurality of effect processing items can be displayed in the effect processing page according to the determined relative display order, and the effect image corresponding to the image to be processed can be determined and displayed in the effect processing page based on the relative display order of the plurality of effect processing items.

According to the technical solution of the embodiment of the present disclosure, the effect processing page is displayed, and then in response to the addition trigger operation for the effect processing identifier in the effect processing page, the effect processing tool corresponding to the effect processing identifier is determined, and the effect processing modes corresponding to the effect processing tool are determined. Finally, in response to a plurality of effect processing modes existing, generating an effect processing item corresponding to each of the plurality of effect processing modes; in response to no effect processing item being displayed in the effect processing page, the relative display order of the plurality of effect processing items is determined according to the preset relative processing order corresponding to the plurality of effect processing modes in the effect processing tool, and the plurality of effect processing items are displayed in the effect processing page based on the relative display order; and the effect image obtained by applying the effect processing modes corresponding to the plurality of effect processing items to the image to be processed is displayed. In this way, the effect of flexibly determining the relative display order of the effect processing items under the condition that no effect processing item is displayed in the effect processing page is realized, and further, the display effect of the effect image is improved, and the effect processing experience is improved for users.

Figure 7:
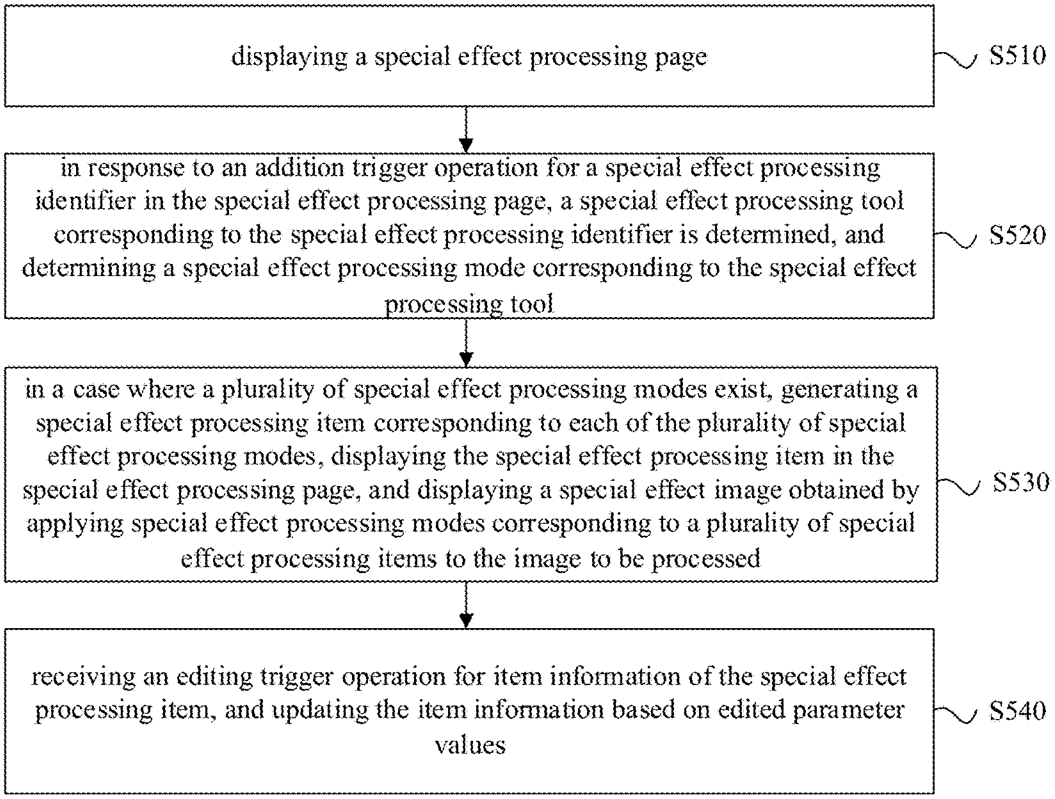
FIG. 7 is a flow diagram of another effect processing method according to an embodiment of the present disclosure.

FIG. 7 is a flow diagram of another effect processing method according to an embodiment of the present disclosure. On the basis of the above embodiment, the technical solution of the present embodiment can edit item information included in the effect processing item after the effect processing item is displayed in the effect processing page, and further, the item information of the effect processing item can be updated according to the editing operation. Detailed implementation can be found in the description of the present embodiment. The same or similar technical features as those in the previous embodiments are not repeated here.

As illustrated by FIG. 7, the method provided by the present embodiment may include the following steps.

In S510, displaying an effect processing page.

In S520, in response to an addition trigger operation for an effect processing identifier in the effect processing page, an effect processing tool corresponding to the effect processing identifier is determined, and determining an effect processing mode corresponding to the effect processing tool.

In S530, in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

In S540, receiving an editing trigger operation for item information of the effect processing item, and updating the item information based on edited parameter values.

In the present embodiment, the item information can be an effect editing item corresponding to the effect processing item, and an effect presented after an effect action mode corresponding to the effect processing item acts on the image to be processed can be changed by editing the effect editing item. Alternatively, the item information includes at least one of identifier information of the effect processing item, an effect processing tool associated with the effect processing item, the effect processing mode associated with the effect processing item in the effect processing tool, and effect action parameters corresponding to the effect processing mode. The identifier information of the effect processing item may be information for identifying the effect processing item. Alternatively, the identifier information of the effect processing item can be icon information corresponding to the effect processing item or text information corresponding to the effect processing item. The effect action parameters may be parameters corresponding to effects corresponding to the effect processing modes. The effect action parameters may include various parameters corresponding to the effect processing modes, such as effect action intensity.

In the related art, when editing the item information of the effect processing tool, the effect processing tool is usually edited as a whole. For an effect processing tool including a plurality of effect processing modes, users cannot edit the parameters of each effect processing mode included in the effect processing tool, which leads to certain limitations of the effect processing tool. Based on this, by adopting the technical solution provided by the present embodiment, each effect processing mode included in the effect processing tool can be edited separately, which improves the flexibility of the effect processing tool and enriches the application modes of the effect processing tool.

Figure 8:
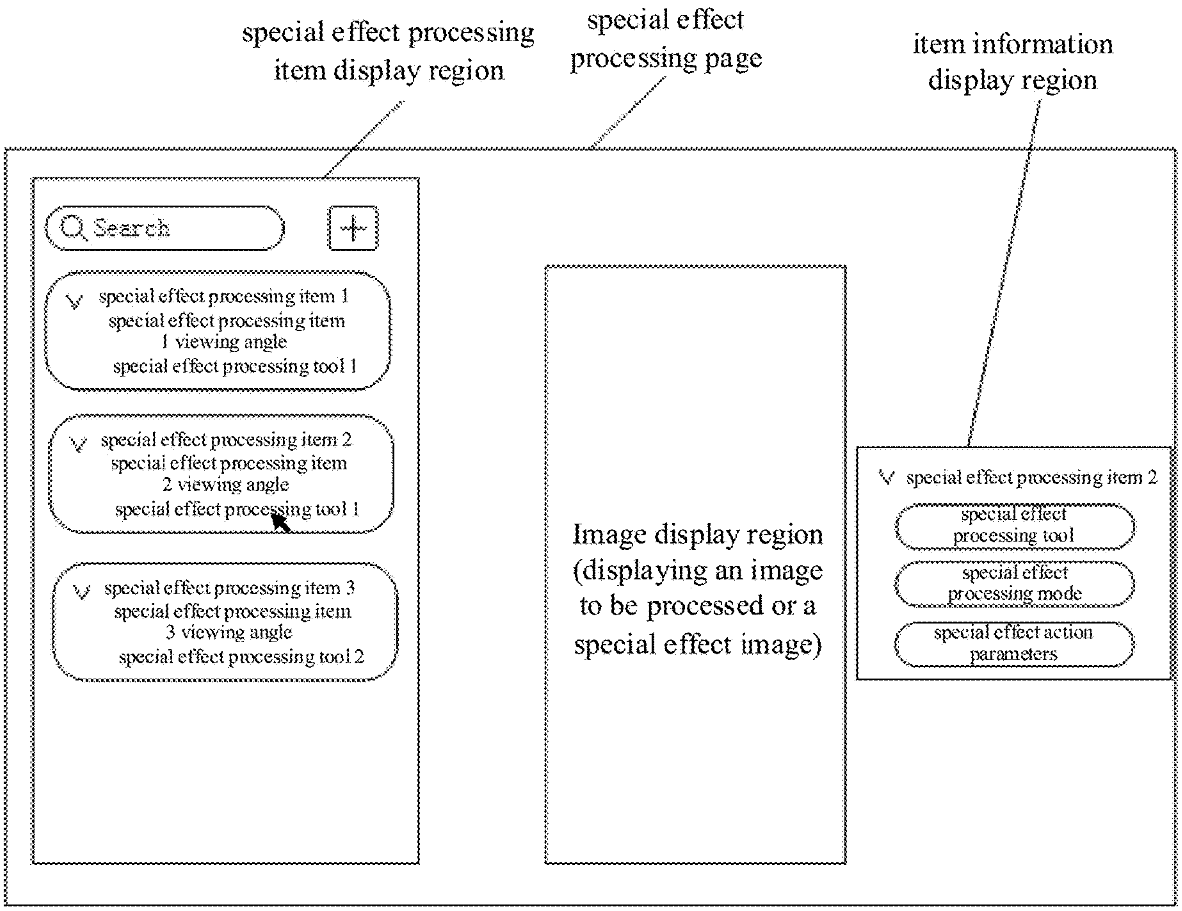
FIG. 8 is a schematic diagram of an effect processing page according to an embodiment of the present disclosure.

In practical application, after displaying a plurality of effect items included in the effect processing tool corresponding to the addition trigger operation in the effect processing page, an interactive entrance is provided for users to edit the effect processing modes included in the effect processing tool. When it is detected that a selection trigger operation for any displayed effect processing item, the item information corresponding to the selected effect processing item can be displayed in the effect processing page. The item information may include at least one of identifier information of the effect processing item, an effect processing tool associated with the effect processing item, the effect processing mode associated with the effect processing item in the effect processing tool, and effect action parameters corresponding to the effect processing mode. Further, an editing trigger operation can be input for one or more pieces of displayed item information to edit the parameter values in the item information, so that the item information can be updated according to the edited parameter values. As illustrated by FIG. 8, the effect processing page also includes an item information display region. When a mouse cursor (arrow in the figure) inputs a trigger operation for the displayed effect processing item 2, the item information corresponding to the effect processing item 2 can be displayed in the item information display region. The displayed item information may include identifier information of the effect processing item 2, an effect processing tool associated with the effect processing item 2, the effect processing mode associated with the effect processing item in the effect processing tool, and effect action parameters corresponding to the effect processing mode.

The editing process of at least one kind of information included in the item information will be explained below.

In the concrete implementation, when it is detected that the editing trigger operation for the effect processing tool associated with the effect processing item included in the item information, pre-developed effect tags corresponding to all the effect processing tools associated with the effect processing item can be displayed, and then users can select from the displayed effect tags through a trigger operation. When it is detected that a trigger operation for any effect tag, the effect processing tool can be updated to an effect processing tool corresponding to the selected effect tag, and at the same time, the effect processing mode associated with the effect processing item in the effect processing tool included in the item information can be updated to an effect processing mode corresponding to the selected effect processing tool. in response to the effect processing tool corresponds to one effect processing mode, the effect processing mode can be directly displayed in an editing item corresponding to the effect processing mode associated with the effect processing item in the effect processing tool. In response to the effect processing mode having corresponding effect action parameters, the effect action parameters corresponding to the effect processing mode can be displayed in an editing item corresponding to effect action parameters corresponding to the effect processing mode in the item information. In response to the effect processing tool corresponding to a plurality of effect processing modes, the effect processing mode arranged in the first place among the plurality of effect processing modes can be displayed in an editing item corresponding to the effect processing modes associated with the effect processing items in the effect processing tool, and then, when it is detected that an editing trigger operation for the editing item, all effect processing modes corresponding to the effect processing tool can be displayed. Users can select from the plurality of effect processing modes through a trigger operation. When it is detected that a trigger operation for any effect processing mode, the selected effect processing mode can be displayed in the editing item corresponding to the effect processing modes associated with the effect processing items in the effect processing tool. Meanwhile, in response to the selected effect processing mode having corresponding effect action parameters, the effect action parameters corresponding to the effect processing mode can be displayed in an editing item corresponding to effect action parameters corresponding to the effect processing mode in the item information, so that the edited parameter values can be determined based on the editing trigger operation, and the item information can be updated based on the edited parameter values.

According to the technical solution of the embodiment of the present disclosure, the effect processing page is displayed, and then in response to the addition trigger operation for the effect processing identifier in the effect processing page, the effect processing tool corresponding to the effect processing identifier is determined, and the effect processing modes corresponding to the effect processing tool are determined. Further, under the condition that a plurality of effect processing modes exist, effect processing items corresponding to each effect processing mode are generated, the effect processing items are displayed in the effect processing page, and the effect image obtained by applying the effect processing modes corresponding to the plurality of effect processing items to the image to be processed is displayed. Finally, the editing trigger operation for item information of the effect processing item is received, and the item information is updated based on the edited parameter values. In this way, users can customize the item information of the effect processing items, which increases the flexibility of editing the effect processing items and improves the effect processing experience for users.

Figure 9:
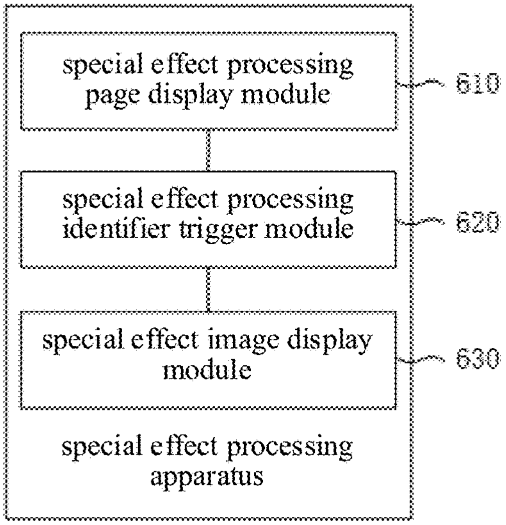
FIG. 9 is a structural diagram of an effect processing apparatus according to an embodiment of the present disclosure.

FIG. 9 is a structural diagram of an effect processing apparatus according to an embodiment of the present disclosure. As illustrated by FIG. 9, the apparatus includes an effect processing page display module 610, an effect processing identifier trigger module 620 and an effect image display module 630.

The effect processing page display module 610 is configured to display an effect processing page, the effect processing page displaying an image to be processed;

- the effect processing identifier trigger module 620 is configured to, in response to an addition trigger operation for an effect processing identifier in the effect processing page, determine an effect processing tool corresponding to the effect processing identifier, and determine effect processing modes corresponding to the effect processing tool; and
- the effect image display module 630 is configured to, in response to a plurality of effect processing modes existing, generate an effect processing item corresponding to each of the plurality of effect processing modes, display the effect processing item in the effect processing page, and display an effect image obtained by applying the effect processing items to the image to be processed.

On the basis of the above technical solutions, the apparatus further includes a relative display position adjustment module and an effect image updating module.

The relative display position adjustment module is configured to, after displaying the effect processing item in the effect processing page, in response to a plurality of effect processing items being displayed in the effect processing page, in response to a position adjustment trigger operation for at least one of the plurality of effect processing items, adjust the relative display positions of the plurality of effect processing items; and the effect image updating module is configured to update a relative display order of the plurality of effect processing items based on the relative display positions as adjusted, and update the effect image based on the relative display order as updated.

On the basis of the above technical solutions, the effect processing identifier trigger module 620 includes a parameter acquisition unit and an effect processing mode determination unit.

The parameter acquisition unit is configured to acquire an annotation protocol corresponding to the effect processing tool, and parse the annotation protocol to acquire key parameters in the annotation protocol; and the effect processing mode determination unit is configured to determine the effect processing modes corresponding to the effect processing tool based on the key parameters.

On the basis of the above technical solutions, the effect image display module 630 includes an effect image determination unit.

The effect image determination unit is configured to, in response to the plurality of effect processing items being displayed in the effect processing page, determine the effect image corresponding to the image to be processed based on a relative display order of the plurality of effect processing items.

On the basis of the above technical solutions, the effect image determination unit is specifically configured to process the image to be processed by sequentially adopting the effect processing modes corresponding to the plurality of effect processing items according to the relative display order of the plurality of effect processing items, so as to obtain the effect image.

On the basis of the above technical solutions, the effect image display module 630 includes an effect processing item determination unit, an effect processing mode determination unit, a relative display position determination unit and an effect processing item display unit.

The effect processing item determination unit is configured to, in response to effect processing items being displayed in the effect processing page, take an effect processing item corresponding to the addition trigger operation as the effect processing item to be added;

- the effect processing mode determination unit is configured to determine effect processing modes corresponding to the effect processing items as displayed;
- the relative display position determination unit is configured to determine a relative display position of the effect processing item to be added based on an effect processing mode corresponding to the effect processing item to be added and the effect processing modes corresponding to the effect processing items as displayed; and
- the effect processing item display unit is configured to display the effect processing item to be added in the effect processing page based on the relative display position of the effect processing item to be added.

On the basis of the above technical solutions, the effect image determination unit is specifically configured to display an effect image obtained by applying the effect processing modes corresponding to all of the plurality of effect processing items displayed in the effect processing page to the image to be processed in a superimposing manner.

On the basis of the above technical solutions, the effect image display module 630 includes a relative display order determination unit.

The relative display order determination unit is configured to, in response to no effect processing item being displayed in the effect processing page, determine a relative display order of the plurality of effect processing items according to a preset relative processing order corresponding to the plurality of effect processing modes in the effect processing tool, and display the plurality of effect processing items in the effect processing page based on the relative display order.

On the basis of the above technical solutions, the apparatus further includes an item information updating module.

The item information updating module is configured to, after displaying the effect processing item in the effect processing page, receive an editing trigger operation for item information of the effect processing item, and update the item information based on edited parameter values, the item information including at least one of identifier information of the effect processing item, an effect processing tool associated with the effect processing item, the effect processing mode associated with the effect processing item in the effect processing tool, and effect action parameters corresponding to the effect processing mode.

According to the technical solution of the embodiment of the present disclosure, by displaying the effect processing page, an interactive entrance for effect processing is provided for users. Further, in response to the addition trigger operation for the effect processing identifier in the effect processing page, the effect processing tool corresponding to the effect processing identifier is determined, and the effect processing modes corresponding to the effect processing tool are determined, so that the editing intention of users on the effect processing tool can be accurately captured, so as to quickly determine the effect processing modes corresponding to the effect processing tool. Finally, under the condition that a plurality of effect processing modes exist, effect processing items corresponding to each effect processing mode are generated, the effect processing items are displayed in the effect processing page, and the effect image obtained by applying the effect processing modes corresponding to the plurality of effect processing items to the image to be processed is displayed, thus solving the technical problem of limited interaction modes and display effects in the related art, realizing fine-grained information display for effect processing tools, supporting refined effects processing effects, increasing the flexibility of effect processing and improving the experience of effect processing.

The effect processing apparatus provided by the embodiments can perform the effect processing method provided by any embodiment of the present disclosure, and has corresponding functional modules for executing the method and relevant effects.

It should be noted that the plurality of units and modules included in the apparatus are categorized based on functional logic, but this classification is not restrictive, as long as corresponding functions can be realized. In addition, the names of multiple functional units are only for the convenience of distinguishing each other, and are not used to limit the protection scope of the embodiment of the present disclosure.

Figure 10:
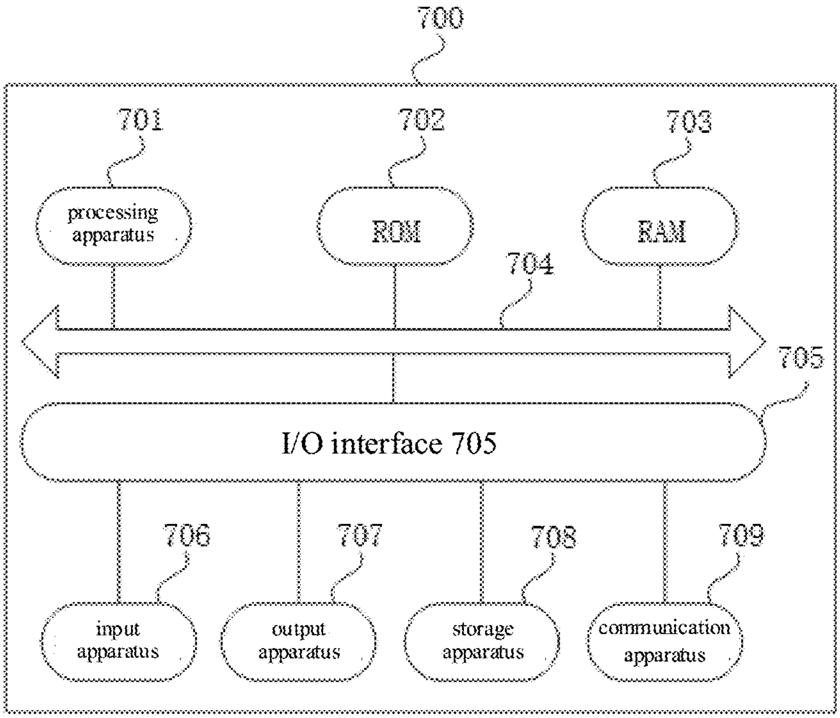
FIG. 10 is a structural diagram of an electronic device according to an embodiment of the present disclosure.

FIG. 10 is a structural diagram of an electronic device according to an embodiment of the present disclosure. Referring to FIG. 10, it is a structural diagram of an electronic device (for example, the terminal device or server in FIG. 10) 700 suitable for implementing the embodiment of the present disclosure. The terminal device in the embodiment of the present disclosure may include but not limited to mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital TV and desktop computers. The electronic device shown in FIG. 10 is only an example, and should not impose any limitations on the functionality and scope of use of the embodiment of the present disclosure.

As illustrated by FIG. 10, the electronic device 700 may include a processing apparatus (such as a central processing unit, and a graphics processor) 701, it may execute various appropriate actions and processes according to a program stored in a read-only memory (ROM) 702 or a program loaded from a storage apparatus 708 to a random access memory (RAM) 703. In RAM 703, various programs and data required for operations of the electronic device 700 are also stored. The processing apparatus 701, ROM 702, and RAM 703 are connected to each other by a bus 704. An input/output (I/O) interface 705 is also connected to the bus 704.

The following apparatuses may be connected to the I/O interface 705: an input apparatus 706 such as a touch screen, a touchpad, a keyboard, a mouse, a camera, a microphone, an accelerometer, and a gyroscope; an output apparatus 707 such as a liquid crystal display (LCD), a loudspeaker, and a vibrator; a storage apparatus 708 such as a magnetic tape, and a hard disk drive; and a communication apparatus 709. The communication apparatus 709 may allow the electronic device 700 to wireless-communicate or wire-communicate with other devices so as to exchange data. Although FIG. 10 shows the electronic device 700 with various apparatuses, it should be understood that it is not required to implement or possess all the apparatuses shown. Alternatively, it may implement or possess the more or less apparatuses.

In particular, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 709, or installed from the storage apparatus 708, or installed from ROM 702. When the computer program is executed by the processing apparatus 701, the above functions defined in the method in the embodiment of the present disclosure are executed.

The names of messages or information exchanged between multiple devices in the embodiment of the present disclosure are only for illustrative purposes, and are not intended to limit the scope of these messages or information.

The electronic device provided in the present embodiment and the effect processing method provided in the above embodiment belong to the same inventive concept. Technical details not described in the present embodiment can be found in the above embodiment, and the present embodiment has the same beneficial effects as the above embodiment.

Embodiments of the present disclosure provide a computer storage medium, on which a computer program is stored, which, when executed by a processor, realizes the effect processing method provided in the above embodiment.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local region network ("LAN"), a wide region network ("WAN"), an internet work (such as the Internet), and an end-to-end network (such as an ad hoc end-to-end network), as well as any currently known or future-developed networks.

The above-described computer-readable medium may be included in the above-described electronic device, or may also exist alone without being assembled into the electronic device.

The above-described computer-readable medium carries one or more programs that, when executed by the electronic device, cause the electronic device to: display an effect processing page, the effect processing page displaying an image to be processed;

in response to an addition trigger operation for an effect processing identifier in the effect processing page, determine an effect processing tool corresponding to the effect processing identifier, and determine effect processing modes corresponding to the effect processing tool; and in response to a plurality of effect processing modes existing, generate an effect processing item corresponding to each of the plurality of effect processing modes, display the effect processing item in the effect processing page, and display an effect image obtained by applying effect processing modes corresponding to a plurality of effect processing items to the image to be processed.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The units involved in the embodiments of the disclosure can be realized by software or hardware. In certain cases, the name of a unit does not constitute a limitation on the unit itself. For example, the first acquisition unit can also be described as "a unit that acquires at least two Internet protocol addresses".

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, [Example 1] provides an effect processing method, which includes:

displaying an effect processing page, the effect processing page displaying an image to be processed;

in response to an addition trigger operation for an effect processing identifier in the effect processing page, determining an effect processing tool corresponding to the effect processing identifier, and determining an effect processing mode corresponding to the effect processing tool; and in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed.

According to one or embodiments of the present disclosure, [example 2] provides the method of example 1, further comprising:

Optionally, after displaying the effect processing item in the effect processing page, further comprising:

in response to a plurality of effect processing items being displayed in the effect processing page, in response to a position adjustment trigger operation for at least one of the plurality of effect processing items, adjusting relative display positions of the plurality of effect processing items; and updating a relative display order of the plurality of effect processing items based on the relative display positions as adjusted, and updating the effect image based on the relative display order as updated.

According to one or embodiments of the present disclosure, [example 3] provides the method of example 1, further comprising:

Optionally, determining the effect processing mode corresponding to the effect processing tool comprises:

acquiring an annotation protocol corresponding to the effect processing tool, and parsing the annotation protocol to acquire key parameters in the annotation protocol; and determining the effect processing mode corresponding to the effect processing tool based on the key parameters.

According to one or embodiments of the present disclosure, [example 4] provides the method of example 1, further comprising:

Optionally, displaying the effect image obtained by applying the effect processing modes corresponding to the plurality of effect processing items to the image to be processed comprises:

in response to the plurality of effect processing items being displayed in the effect processing page, determining the effect image corresponding to the image to be processed based on a relative display order of the plurality of effect processing items.

According to one or embodiments of the present disclosure, [example 5] provides the method of example 1, further comprising:

Optionally, determining the effect image corresponding to the image to be processed based on the relative display order of the plurality of effect processing items comprises:

processing the image to be processed by sequentially adopting the effect processing modes corresponding to the plurality of effect processing items according to the relative display order of the plurality of effect processing items, so as to obtain the effect image.

According to one or embodiments of the present disclosure, [example 6] provides the method of example 1, further comprising:

Optionally, displaying the effect processing item in the effect processing page comprises:

in response to effect processing items being displayed in the effect processing page, taking an effect processing item corresponding to the addition trigger operation as the effect processing item to be added;

determining effect processing mode corresponding to the effect processing items as displayed;

determining a relative display position of the effect processing item to be added based on an effect processing mode corresponding to the effect processing item to be added and the effect processing modes corresponding to the effect processing items as displayed; and displaying the effect processing item to be added in the effect processing page based on the relative display position of the effect processing item to be added.

According to one or embodiments of the present disclosure, [example 7] provides the method of example 1, further comprising:

Optionally, displaying the effect image obtained by applying the effect processing modes corresponding to the plurality of effect processing items to the image to be processed comprises:

displaying an effect image obtained by applying the effect processing modes corresponding to all of the plurality of effect processing items displayed in the effect processing page to the image to be processed in a superimposing manner.

According to one or embodiments of the present disclosure, [example 8] provides the method of example 1, further comprising:

Optionally, displaying the effect processing item in the effect processing page comprises:

in response to no effect processing item being displayed in the effect processing page, determining a relative display order of a plurality of effect processing items according to a preset relative processing order corresponding to the plurality of effect processing modes in the effect processing tool, and displaying the plurality of effect processing items in the effect processing page based on the relative display order.

According to one or embodiments of the present disclosure, [example 9] provides the method of example 1, further comprising:

Optionally, after displaying the effect processing item in the effect processing page, further comprising:

receiving an editing trigger operation for item information of the effect processing item, and updating the item information based on edited parameter values, the item information comprising at least one of identifier information of the effect processing item, an effect processing tool associated with the effect processing item, the effect processing mode associated with the effect processing item in the effect processing tool, and effect action parameters corresponding to the effect processing mode.

According to one or embodiments of the present disclosure, [example 10] provides the method of example 1, further comprising:

Optionally, an effect processing page display module configured to display an effect processing page, the effect processing page displaying an image to be processed;

an effect processing identifier trigger module configured to, in response to an addition trigger operation for an effect processing identifier in the effect processing page, determine an effect processing tool corresponding to the effect processing identifier, and determine an effect processing mode corresponding to the effect processing tool; and an effect image display module configured to, in response to a plurality of effect processing modes existing, generate an effect processing item corresponding to each of the plurality of effect processing modes, display the effect processing item in the effect processing page, and display an effect image obtained by applying effect processing items to the image to be processed.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and acts described above are only exemplary forms of implementing the claims.

The invention claimed is:

1. An effect processing method, comprising:

displaying an effect processing page, the effect processing page displaying an image to be processed;

in response to an addition trigger operation for an effect processing identifier in the effect processing page, determining an effect processing tool corresponding to the effect processing identifier, and determining an effect processing mode corresponding to the effect processing tool;

in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed;

in response to a plurality of effect processing items being displayed in the effect processing page, adjusting relative display positions of the plurality of effect processing items in response to a position adjustment trigger operation for at least one of the plurality of effect processing items; and updating a relative display order of the plurality of effect processing items based on the relative display positions as adjusted, and updating the effect image based on the relative display order as updated.

2. The effect processing method according to claim 1, wherein determining the effect processing mode corresponding to the effect processing tool comprises:

acquiring an annotation protocol corresponding to the effect processing tool, and parsing the annotation protocol to acquire key parameters in the annotation protocol; and determining the effect processing mode corresponding to the effect processing tool based on the key parameters.

3. The effect processing method according to claim 1, wherein displaying the effect image obtained by applying the effect processing modes corresponding to the plurality of effect processing items to the image to be processed comprises:

in response to the plurality of effect processing items being displayed in the effect processing page, determining the effect image corresponding to the image to be processed based on the relative display order of the plurality of effect processing items.

4. The effect processing method according to claim 3, wherein determining the effect image corresponding to the image to be processed based on the relative display order of the plurality of effect processing items comprises:

processing the image to be processed by sequentially adopting the effect processing modes corresponding to the plurality of effect processing items according to the relative display order of the plurality of effect processing items, so as to obtain the effect image.

5. The effect processing method according to claim 1, wherein displaying the effect processing item in the effect processing page comprises:

in response to effect processing items being displayed in the effect processing page, taking an effect processing item corresponding to the addition trigger operation as the effect processing item to be added;

determining effect processing mode corresponding to the effect processing items as displayed;

determining a relative display position of the effect processing item to be added based on an effect processing mode corresponding to the effect processing item to be added and the effect processing modes corresponding to the effect processing items as displayed; and displaying the effect processing item to be added in the effect processing page based on the relative display position of the effect processing item to be added.

6. The effect processing method according to claim 5, wherein displaying the effect image obtained by applying the effect processing modes corresponding to the plurality of effect processing items to the image to be processed comprises:

displaying an effect image obtained by applying the effect processing modes corresponding to all of the plurality of effect processing items displayed in the effect processing page to the image to be processed in a superimposing manner.

7. The effect processing method according to claim 1, wherein displaying the effect processing item in the effect processing page comprises:

in response to no effect processing item being displayed in the effect processing page, determining the relative display order of the plurality of effect processing items according to a preset relative processing order corresponding to the plurality of effect processing modes in the effect processing tool, and displaying the plurality of effect processing items in the effect processing page based on the relative display order.

8. The effect processing method according to claim 1, after displaying the effect processing item in the effect processing page, further comprising:

receiving an editing trigger operation for item information of the effect processing item, and updating the item information based on edited parameter values, the item information comprising at least one of identifier information of the effect processing item, an effect processing tool associated with the effect processing item, the effect processing mode associated with the effect processing item in the effect processing tool, and effect action parameters corresponding to the effect processing mode.

9. The effect processing method according to claim 1, wherein the effect processing tool is an effect processing tool including a generative adversarial network (GAN) model.

10. An electronic device, comprising:

one or more processors; and a memory configured to store one or more programs, wherein the one or more programs, when executed by the one or more processors, cause the one or more processors to implement operations comprising:

displaying an effect processing page, the effect processing page displaying an image to be processed;

in response to an addition trigger operation for an effect processing identifier in the effect processing page, determining an effect processing tool corresponding to the effect processing identifier, and determining an effect processing mode corresponding to the effect processing tool;

in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed;

in response to a plurality of effect processing items being displayed in the effect processing page, adjusting relative display positions of the plurality of effect processing items in response to a position adjustment trigger operation for at least one of the plurality of effect processing items; and updating a relative display order of the plurality of effect processing items based on the relative display positions as adjusted, and updating the effect image based on the relative display order as updated.

11. The electronic device according to claim 10, wherein determining the effect processing mode corresponding to the effect processing tool comprises:

acquiring an annotation protocol corresponding to the effect processing tool, and parsing the annotation protocol to acquire key parameters in the annotation protocol; and determining the effect processing mode corresponding to the effect processing tool based on the key parameters.

12. The electronic device according to claim 10, wherein displaying the effect processing item in the effect processing page comprises:

in response to effect processing items being displayed in the effect processing page, taking an effect processing item corresponding to the addition trigger operation as the effect processing item to be added;

determining effect processing mode corresponding to the effect processing items as displayed;

determining a relative display position of the effect processing item to be added based on an effect processing mode corresponding to the effect processing item to be added and the effect processing modes corresponding to the effect processing items as displayed; and displaying the effect processing item to be added in the effect processing page based on the relative display position of the effect processing item to be added.

13. The electronic device according to claim 10, wherein displaying the effect processing item in the effect processing page comprises:

in response to no effect processing item being displayed in the effect processing page, determining the relative display order of the plurality of effect processing items according to a preset relative processing order corresponding to the plurality of effect processing modes in the effect processing tool, and displaying the plurality of effect processing items in the effect processing page based on the relative display order.

14. The electronic device according to claim 10, after displaying the effect processing item in the effect processing page, the operations further comprising:

receiving an editing trigger operation for item information of the effect processing item, and updating the item information based on edited parameter values, the item information comprising at least one of identifier information of the effect processing item, an effect processing tool associated with the effect processing item, the effect processing mode associated with the effect processing item in the effect processing tool, and effect action parameters corresponding to the effect processing mode.

15. The electronic device according to claim 10, wherein the effect processing tool is an effect processing tool including a generative adversarial network (GAN) model.

16. A non-transitory storage medium containing computer-executable instructions, wherein the computer-executable instructions, when executed by a processor, cause the processor to perform operations comprising:

displaying an effect processing page, the effect processing page displaying an image to be processed;

in response to an addition trigger operation for an effect processing identifier in the effect processing page, determining an effect processing tool corresponding to the effect processing identifier, and determining an effect processing mode corresponding to the effect processing tool;

in response to a plurality of effect processing modes existing, generating an effect processing item corresponding to each of the plurality of effect processing modes, displaying the effect processing item in the effect processing page, and displaying an effect image obtained by applying effect processing modes corresponding to a plurality of effect processing items to the image to be processed;

in response to a plurality of effect processing items being displayed in the effect processing page, adjusting relative display positions of the plurality of effect processing items in response to a position adjustment trigger operation for at least one of the plurality of effect processing items; and updating a relative display order of the plurality of effect processing items based on the relative display positions as adjusted, and updating the effect image based on the relative display order as updated.

17. The non-transitory storage medium according to claim 16, wherein determining the effect processing mode corresponding to the effect processing tool comprises:

acquiring an annotation protocol corresponding to the effect processing tool, and parsing the annotation protocol to acquire key parameters in the annotation protocol; and determining the effect processing mode corresponding to the effect processing tool based on the key parameters.

18. The non-transitory storage medium according to claim 16, wherein displaying the effect processing item in the effect processing page comprises:

in response to effect processing items being displayed in the effect processing page, taking an effect processing item corresponding to the addition trigger operation as the effect processing item to be added;

determining effect processing mode corresponding to the effect processing items as displayed;

determining a relative display position of the effect processing item to be added based on an effect processing mode corresponding to the effect processing item to be added and the effect processing modes corresponding to the effect processing items as displayed; and displaying the effect processing item to be added in the effect processing page based on the relative display position of the effect processing item to be added.

19. The non-transitory storage medium according to claim 16, wherein displaying the effect processing item in the effect processing page comprises:

in response to no effect processing item being displayed in the effect processing page, determining the relative display order of the plurality of effect processing items according to a preset relative processing order corresponding to the plurality of effect processing modes in the effect processing tool, and displaying the plurality of effect processing items in the effect processing page based on the relative display order.

20. The non-transitory storage medium according to claim 16, after displaying the effect processing item in the effect processing page, the operations further comprising:

receiving an editing trigger operation for item information of the effect processing item, and updating the item information based on edited parameter values, the item information comprising at least one of identifier information of the effect processing item, an effect processing tool associated with the effect processing item, the effect processing mode associated with the effect processing item in the effect processing tool, and effect action parameters corresponding to the effect processing mode.

* * * * *